Livingston, Roggen & Adams,
Latch.
No. 179. Reissued Oct. 1, 1850.
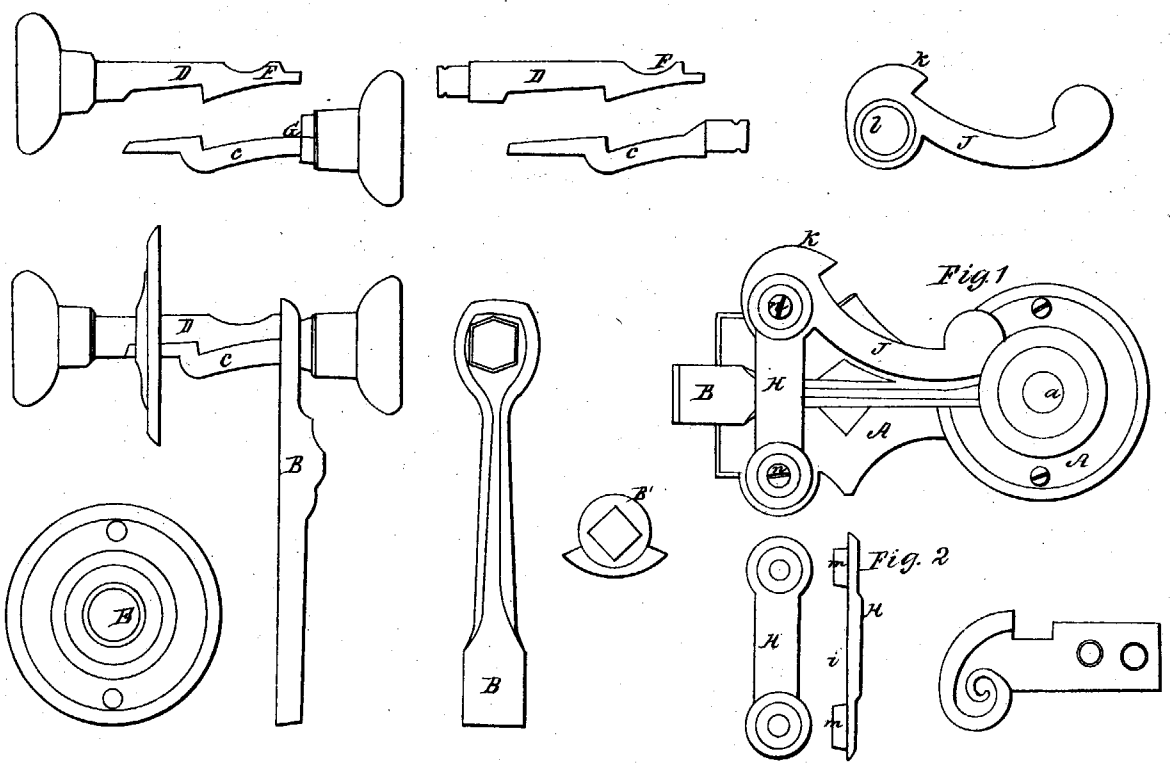
AM. PHOTO-LITHO. CO. N.Y. (OSBORNE'S PROCESS.)

UNITED STATES PATENT OFFICE.

LAURESTON R. LIVINGSTON, JOHN J. ROGGEN, AND CALVIN ADAMS, OF PITTSBURG, PENNSYLVANIA.

IMPROVEMENT IN SHANKS OF DOOR-KNOBS.

Specification forming part of Letters Patent No. 4,620, dated July 7, 1846; Additional Improvement dated December 11, 1847; Reissue No. 179, dated October 1, 1850.

*To all whom it may concern:*

Be it known that we, LAURESTON R. LIVINGSTON, JOHN J. ROGGEN, and CALVIN ADAMS, of the city of Pittsburg, county of Allegheny, and State of Pennsylvania, have invented sundry new and useful Improvements in Door Locks or Latches; and we do hereby declare that the following is a full and exact description thereof, reference being had to the accompanying drawings, making a part of this specification.

We make the shank for the door-knobs in two pieces, one for the inside and the other for the outside of the door. Each shank-piece is firmly joined to its corresponding knob, either by casting the knobs and shank-pieces together or by casting the knobs upon the shank pieces; or the knobs may be made separately, either of cast-iron, composition, pottery, or glass, and afterward joined firmly to the shank-pieces by cementing, riveting, or screwing.

The two shank-pieces above referred to are coupled together near the middle by a zigzag connection running diagonally about two-thirds the whole length and thickness. Each shank-piece is made an oblong, square at one end and half round at the other, so that when the two pieces are placed together they will fill a square hole in the latch-bolt B (or in the tumbler B′, that operates a latch-bolt) and a round hole, E, in the escutcheon.

It will be seen by reference to the drawings that when the plate A is screwed to the door, and the latch-bolt B (or tumbler) put in its proper position in relation thereto, as shown in Figure 1, that when the knob shank-piece C is passed through the opening *a* of the plate, outside of the latch-bolt or tumbler, and also through the square hole in the latch-bolt or tumbler, and after the two knob shank-pieces C and D are placed together and made to enter into the round hole E in the escutcheon the knob shank-pieces cannot be possibly drawn out or separated, the knob shank-pieces being held together by the latch-bolt or tumbler and the escutcheon. The projection F at the end of the shank-piece D, bearing against the latch-bolt or tumbler, prevents the knob from being drawn out on the inside, and the fillet G, bearing against the plate A, keeps the knob from being drawn out from the outside. It will also be seen that to accommodate doors of different thicknesses the shank-pieces are made sufficiently long for the thickest doors, and any variation of thickness is easily fitted by simply sliding the escutcheon to its proper place against the door.

H is the keeper, placed in front of the latch-bolt B to guide its movements, which keeper is confined to the plate A in the following manner, to wit: Tubular projections *m m*, Fig. 2, from the inner side of the keeper, are brought in contact with tubular projections on the front side of the said plate, and the keeper is secured in its place by screws *n n*, passing through the same and through the plate into the door. The outer end of the latch-bolt B rests upon the supporting-pin *i*, or its equivalent, connected to the inner side of the keeper H, which retains the latch-bolt in such a position that it will be opposite, or nearly so, to the longitudinal center of the plate A and consequently the said latch-bolt will have ample room to play up and down between the said supporting-pin and the intended top of the keeper. It will therefore be perceived that this manner of adjusting and fitting the keeper H and the latch-bolt with each other enables the latch to be converted at pleasure into a perfect right or left hand latch by simply reversing the position of the keeper with reference to the plate A, so as to have the same end thereof uppermost when the latch is applied to a door.

J is a lever-fastener having two finished faces secured between the keeper H and the plate A above the latch-bolt B, by suitable bearings arranged in such a manner that the said lever-fastener may be reversed in its position with relation to the said keeper, to adapt them to right or left hand latches, which lever-fastener serves the purpose of fastening down the latch-bolt when it (the said lever-fastener) is thrown into one position and admits the latch-bolt to play up and down freely when the said lever-fastener is thrown into an opposite position—to wit: when the lever-fastener is in the position shown in Fig. 1, the latch-bolt B is allowed to play up and down freely, and when the outer end of the said lever-fastener is thrown over toward the outer end of the latch-bolt the projection *k* on the lever-fastener will bear against the upper edge of the latch-bolt and prevent it from being raised.

The additional improvement, which was on the 11th day of December, 1847, annexed and added to the Letters Patent that were granted to us, bearing date of the 7th day of July, 1846, we do hereby declare the following to be a full and exact description of, reference being had to the accompanying drawings on Sheet 2, making a part of the same, in which—

Figs. 1, 2, 3, 4, and 5 show in detail our improved method of uniting and securing the respective parts of the shanks of door-knobs to each other, and also to the lock in which they are placed; and Fig. 6 is a perspective view of a broken section of a door with a lock attached thereto from which the knobs and shanks have been removed.

Similar letters indicate like parts in all the figures.

The third claim appended hereto covers this our said additional improvement in door-locks or latches.

Our additional improvement consists in the manner of connecting the shanks attached to each of the knobs of a lock to each other and to the lock by means of a tooth projecting from the halved portion of one of the shanks fitting into an aperature in the halved portion of the other shank, and combined with the tumbler of a lock, a tubular projection on the side of the lock, and the escutcheon, as hereinafter set forth, by which improved method of fastening the shanks we are enabled to make that portion of the shank that passes through the door and escutcheon perfectly smooth and cylindrical, and susceptible of being plated or receiving any other superior finish.

C is the cylindrical portion of the shank attached to the knob on the inner side of the door, which works in the sustaining-tube F, projecting from the exposed side of the lock. D is the cylindrical portion of the shank of a knob on the outer side of a door. E is the escutcheon in which the shank D works and is sustained. A is the halved portion of the shank C, which is united to the halved portion B of the shank D, as represented in Figs. 3 and 4. When they are brought together, the feather *g* on the face of A fits into the groove *h* in the face of B, and the tooth *t*, projecting from the face of B, fits into the aperture *m* in A. The lock being arranged for the reception of the knobs, (with the tumbler *i* in its place,) the halved portion A of the shank C is passed through the tumbler, and the cylindrical portion of the same is inserted in the tube F. The halved portion B of the shank D is then passed through the escutcheon and door and inserted in the lock, the tenon *n* at its end fitting accurately into the tumbler *i*, as represented in Figs. 3 and 4. The escutcheon E is then made fast to the door in such a position as to confine the shank D in a direct line with the shank C. The shank C is guided and sustained in a horizontal position by the tube F. When the shanks C and D are retained in a horizontal position, it will be perceived that the tooth *t*, fitting into the aperture *m*, in conjunction with the tumbler *i*, will securely confine them to each other and to the lock.

What we claim as our invention, and desire to secure by Letters Patent, is—

1. The method of making the shank for door-knobs in two pieces coupled together near the middle by a notched connection, and held together by means of the escutcheon at one end and the latch-bolt B (or by the tumbler B′, that operates a latch-bolt) at the other, substantially as herein described.

2. The constructing the keeper H and the lever-fastener J of such shape and proportions that the keeper can be reversed in its position upon the latch-plate A, and the lever-fastener be reversed in its position in relation to the keeper, for the purpose of adapting our improved lock or latch to doors opening either to the right or to the left, substantially as herein set forth.

3. The connecting the respective shanks of the knobs to each other and to the lock or latch by means of the tooth in the halved portion of one shank fitting into an aperture in the halved portion of the other, and the two being confined to each other by the tumbler *i*, the tube F, projecting from the side of the lock or latch, and the escutcheon E, secured to the door, substantially in the manner herein set forth.

L. R. LIVINGSTON.
JOHN JAY ROGGEN.
CALVIN ADAMS.

Witnesses as to L. R. Livingston's and John J. Roggen's signatures:
W. B. COPELAND,
N. BUCKMASTER.

Witnesses as to C. Adams's signature:
Z. C. ROBBINS,
J. S. SMITH.